United States Patent [19]

Hinn

[11] Patent Number: 4,677,491
[45] Date of Patent: Jun. 30, 1987

[54] SAMPLE AND HOLD CIRCUIT FOR A CONTROL SYSTEM IN A VIDEO SIGNAL PROCESSOR

[75] Inventor: Werner Hinn, Zollikerberg, Switzerland

[73] Assignee: RCA Corporation, Princeton, N.J.

[21] Appl. No.: 896,504

[22] Filed: Aug. 15, 1986

[30] Foreign Application Priority Data

Oct. 1, 1985 [GB] United Kingdom ............... 8524196

[51] Int. Cl.⁴ .................. H04N 5/68; H04N 9/20
[52] U.S. Cl. ................................ 358/242; 358/29; 358/65
[58] Field of Search ............... 358/242, 174, 243, 29, 358/64, 65, 168, 169, 74

[56] References Cited

U.S. PATENT DOCUMENTS

| | | | |
|---|---|---|---|
| 4,130,829 | 11/1978 | Kam ...................... | 358/65 |
| 4,387,405 | 6/1983 | Hinn ..................... | 358/243 |
| 4,484,228 | 11/1984 | Parker ................... | 358/243 |
| 4,502,073 | 2/1985 | Hinn ..................... | 358/242 |
| 4,587,566 | 5/1986 | Hinn ..................... | 358/242 |

Primary Examiner—Tommy P. Chin
Attorney, Agent, or Firm—P. J. Rasmussen; P. M. Emanuel; R. H. Kurdyla

[57] ABSTRACT

A video signal processing and display system includes apparatus for automatically controlling the bias of an image display device. A sample and hold network of the control apparatus includes an amplifier, a switch and a storage capacitor. During sampling intervals the switch connects the capacitor directly to a bias control terminal. During substantially longer holding intervals, the switch connects the capacitor to the bias control terminal via the amplifier.

4 Claims, 3 Drawing Figures

SAMPLE AND HOLD CIRCUIT FOR A CONTROL SYSTEM IN A VIDEO SIGNAL PROCESSOR

This invention concerns a sample and hold circuit suitable for use in apparatus for automatically controlling an operating parameter, such as bias, of an image display device such as a kinescope in a video signal processing and display system.

Conventional television receivers sometimes employ an automatic kinescope bias (AKB) control system for automatically maintaining a desired black current level for an associated image displaying kinescope. As a result of this operation, displayed picture colors and gray scale tracking of the kinescope are prevented from being adversely affected by unwanted variations of kinescope bias due to aging and temperature effects, among other factors. An AKB system suitable for use in a conventional television receiver is shown, for example, in my U.S. Pat. Nos. 4,263,622 and 4,387,405.

An AKB system typically operates during image blanking intervals when the kinescope conducts a small black current representative of a black image. This current is sensed by the AKB system to generate a bias control signal representing the difference between the magnitude of the sensed black current and a desired black current reference level, and the control signal is applied to the kinescope with a sense for reducing the difference.

The AKB system described in my aforementioned U.S. patents is particularly advantageous with respect to significantly reducing the effects of kinescope leakage currents upon measurement of the black current level. In that system, an induced kinescope cathode output pulse is produced in response to a pulse applied to a grid electrode of the kinescope. The magnitude of the induced pulse is representative of the black current level, and is processed to develop the bias control signal. The "induced pulse" technique can also be employed to maintain a desired white drive, or gain, characteristic of the kinescope in a white balance control system to assure the display of a white image in response to a video signal containing white information.

A data display video monitor, such as a computer display terminal, can also benefit from an AKB system, particularly an AKB system of the "induced pulse" type mentioned previously, as described in my copending U.S. patent application Ser. No. 896,503, titled "Automatic Bias Control of an Image Display Device in a Video Monitor." In that system the AKB signal processing circuits are activated during a sampling interval when a signal having a magnitude related to the kinescope black current level is sampled. The signal sample is stored by a capacitor to provide a bias control voltage for maintaining a desired kinescope black current level. The sampling interval is preceded and followed by a substantially longer holding interval, e.g., of five minutes duration, during which time the AKB signal processing circuits are inactive. The long holding interval dictates the need for a holding circuit which can reliably prevent the bias control voltage stored by the capacitor from deteriorating during the long holding interval.

In a disclosed embodiment of a system including such a holding circuit in accordance with the principles of the present invention, a bias control circuit provides a bias control signal from an output terminal to an image display device to maintain a desired black current bias condition of the display device. The control circuit includes a storage capacitor which receives a signal with a magnitude related to the black current level of the display device. The related signal is conveyed to the capacitor via a circuit including a switch, and an amplifier having inverting and noninverting signal inputs and an output coupled to the inverting input. The switch has an input coupled to the output terminal of the control circuit, a first output coupled to the capacitor and to the noninverting amplifier input, and a second output coupled to the inverting input and output of the amplifier. The switch connects the output terminal of the control circuit to the first switch output during sampling intervals. During holding intervals, the switch connects the output terminal of the control circuit to the second switch output.

The disclosed amplifier and switching arrangement advantageously facilitates the use of an auxiliary control voltage in connection with the storage capacitor. An example of such an auxiliary voltage is a preset bias control voltage to be applied to the storage capacitor for a given time before the display device has warmed up after the system is initially energized.

Figure 1:
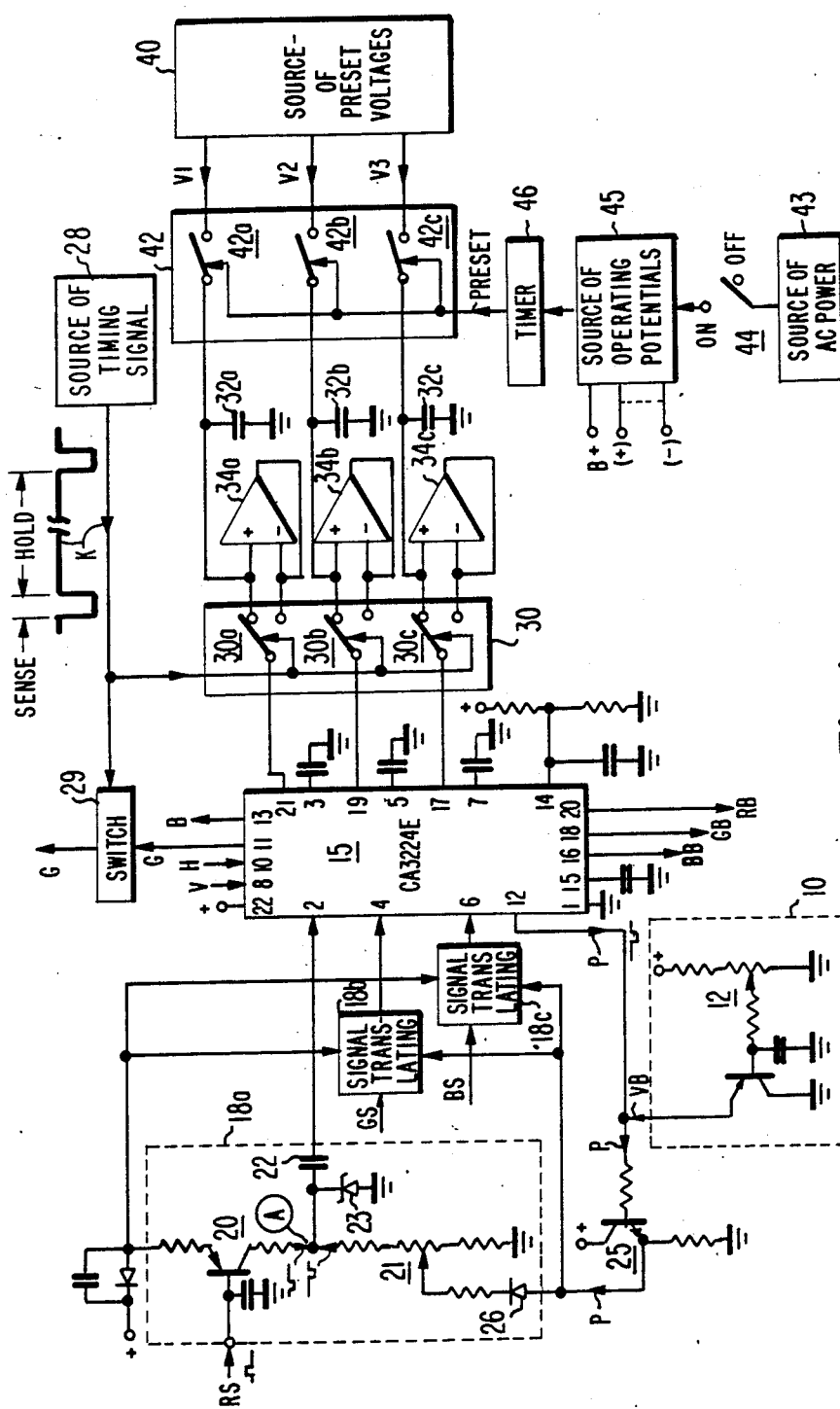
FIG. 1 shows a portion of an AKB system including a sample and hold circuit in accordance with the principles of the present invention, for use in a video monitor.

The video monitor system of FIG. 1 includes an AKB signal processor integrated circuit 15, which is the type CA 3224E integrated circuit commercially available from the Solid State Division of RCA Corporation, Somerville, NJ. Information concerning the structure and operation of the CA 3224E integrated circuit is found in the RCA preliminary data bulletin for the CA 3224E, file No. 1553. Additional information concerning the use of this integrated circuit is found in an article titled "An Automatic Kinescope Biasing System", authored by J. C. Tallant, II, et al., published in the IEEE Transactions on Consumer Electronics, Vol. CE-30, No. 4, November 1984.

Briefly, circuit 15 receives horizontal (H) and vertical (V) synchronizing signals, derived from deflection circuits of the monitor, for providing output signals G, B and P at terminals 11, 13 and 12, respectively. Signal G is a periodic pulse signal which is employed to excite (forward bias) the control grid electrode of an image reproducing kinescope (shown in FIG. 2) during AKB operating control intervals for inducing a kinescope cathode output pulse, hereinafter referred to as the "AKB pulse," with a magnitude related to the magnitude of black current conducted by the kinescope. Signal B is a blanking signal which encompasses the AKB operating control interval. Signal B is used to inhibit video signals prior to the kinescope driver stage, as will be seen from FIG. 2, so that the video signals do not interfere with the operation of the AKB system. Input terminals 2, 4 and 6 of AKB processor circuit 15 are respectively coupled to the red, green and blue video signal channels for receiving respective sensed black current representative signals during given AKB operating intervals as will be explained.

The kinescope associated with this data display video monitor, e.g., a computer display terminal, is a raster scan device wherein each image scanning field interval following the vertical retrace interval includes, in the visible area along the top edge of the kinescope display screen, a small area several horizontal image lines wide where data is normally not displayed. This area is followed by the active data display viewing area which encompasses the remainder of the display screen, except for a further small area along the bottom edge of the display screen at the end of the vertical scanning field (i.e., just prior to the beginning of the vertical retrace interval) where data is normally not displayed. Thus the kinescope of the disclosed system does not include an "overscan" area along and beyond the top and bottom edges of the display screen, out of sight of the viewer.

Figure 2:
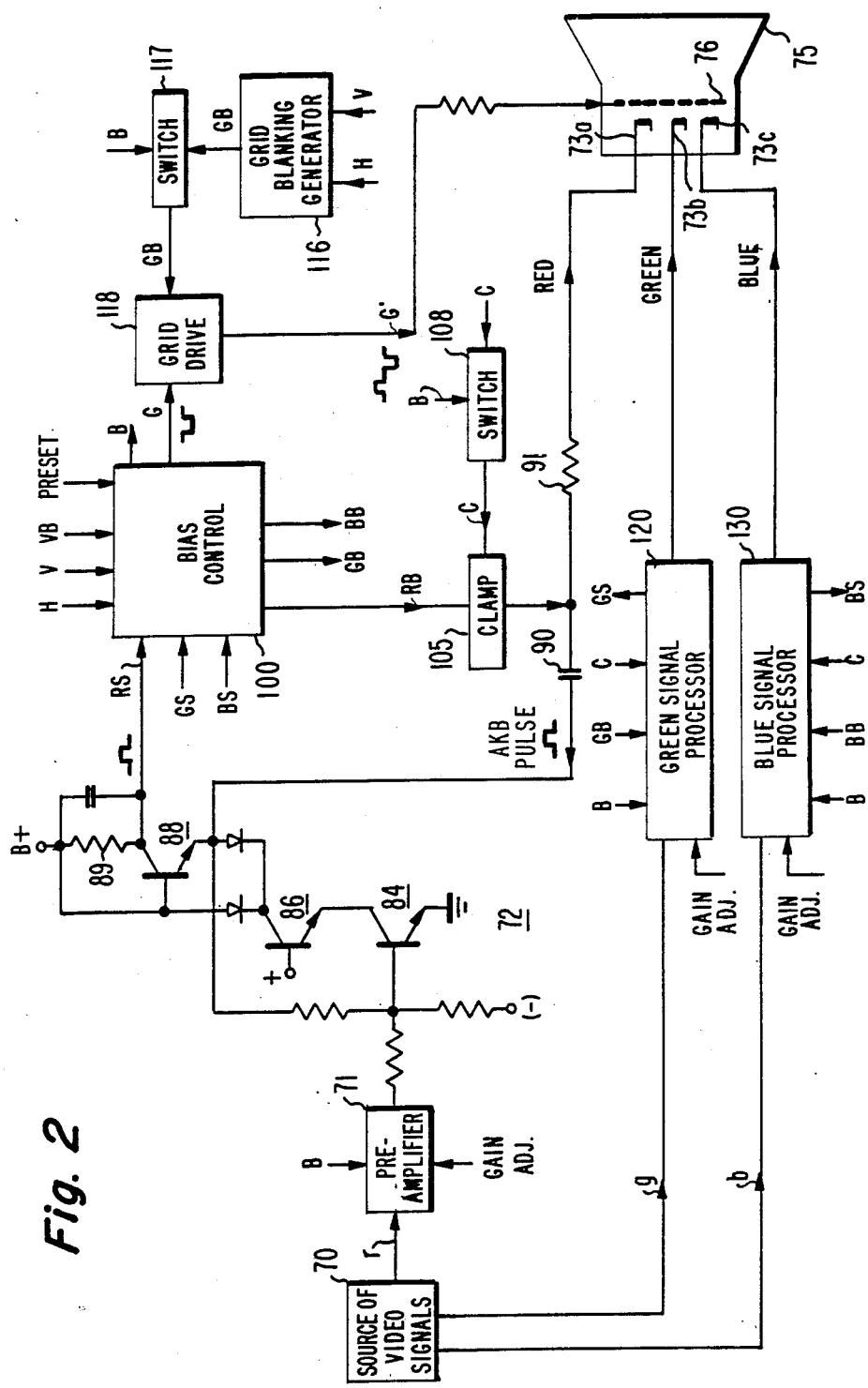
FIG. 2 shows additional details of a video monitor including the AKB system of FIG. 1.
Figure 3:
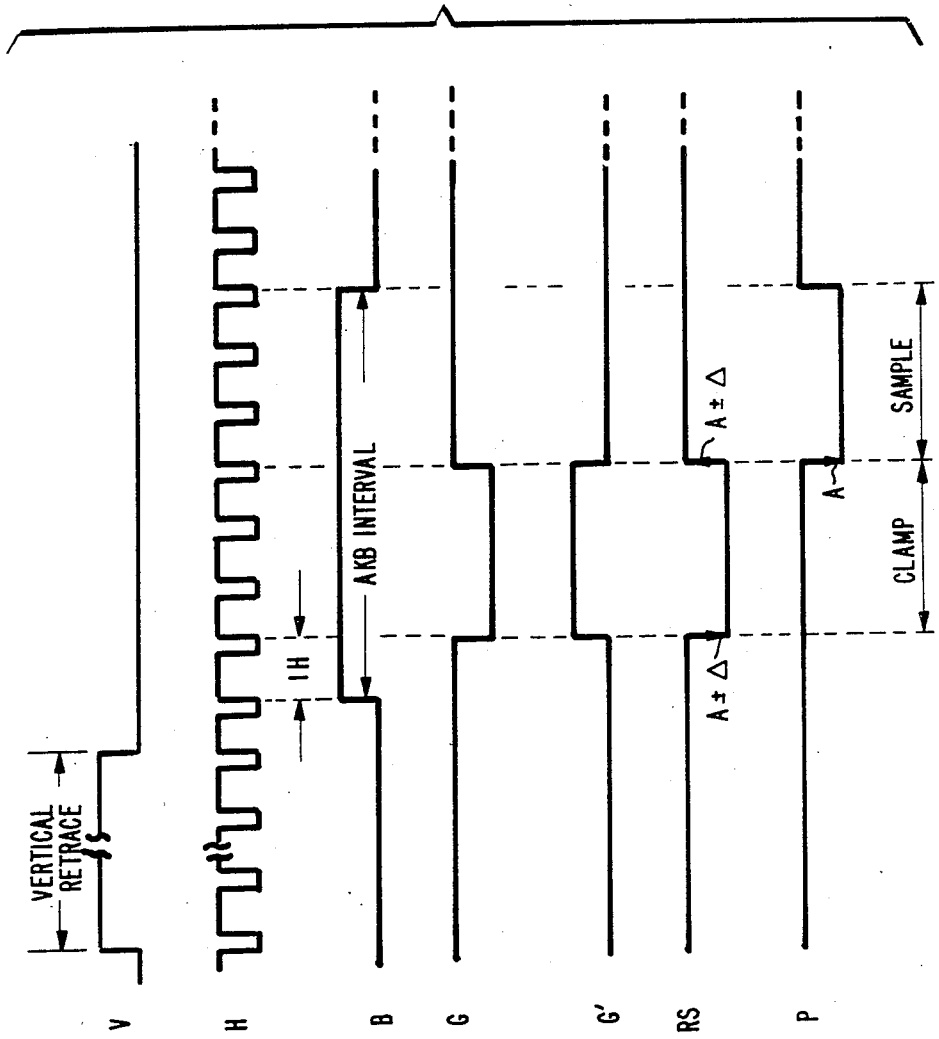
FIG. 3 illustrates signal waveforms helpful in understanding the operation of the AKB system shown in FIGS. 1 and 2.

A sensed black current representative positive pulse signal RS for the red channel, produced as will be discussed in connection with FIGS. 2 and 3, is AC coupled via a signal translating circuit 18a to input terminal 2 of circuit 15. Signal RS is derived from the black current representative AKB pulse produced in response to excitation of the kinescope grid, as will be seen from FIG. 2. Circuit 18a includes a signal inverting amplifier transistor 20 which receives signal RS, a preset brightness tracking potentiometer 21 in a collector output circuit of transistor 20, an AC coupling capacitor 22, and a Zener diode 23 for limiting large signal amplitudes appearing during image trace intervals, all arranged as shown. Signal translating circuits 18b and 18c respectively receive sensed black current representative signals GS and BS from the green and blue video signal channels for application to input terminals 4 and 6 of circuit 15, and are similar in structure and operation to circuit 18a.

AKB circuit 15 includes signal processing circuits such as clamping, sampling and comparator circuits responsive to translated black current representative input signals RS, GS and BS for producing kinescope bias control output signals RB, GB and BB. These signals are respectively applied to red, green and blue video signal processing channels for maintaining a desired black current DC bias condition of the kinescope as will be discussed in connection with FIG. 2.

For AKB control purposes circuit 15 produces a so-called auxiliary "program pulse" P of fixed amplitude at output terminal 12 during a prescribed portion of each AKB operating control interval. Brightness control is accomplished by varying the magnitude of pulse P in accordance with the level of a variable brightness control voltage VB from a brightness control source 10 to produce a pulse P with a magnitude related to the setting of a viewer adjustable brightness control potentiometer 12. Voltage VB is at a maximum positive level for producing maximum image brightness when the wiper of potentiometer is at the uppermost setting. Conversely, minimum brightness is produced at the lowermost setting of the wiper of potentiometer 12. Pulse P is coupled via a buffer transistor 25 to signal translating circuits 18a, 18b and 18c. Illustratively, in translating circuit 18a pulse P is coupled to a signal combining point A via a decoupling diode 26 and brightness tracking potentiometer 21. The role of pulse P and other aspects of the AKB system will be better understood by considering the waveforms of FIG. 3.

In FIG. 3, signal V includes a positive pulse component occurring during the vertical retrace blanking interval, which encompasses several horizontal line intervals (1H) as illustrated by the waveform of horizontal line signal H. AKB blanking signal B encompasses several horizontal line intervals including a clamp reference interval and a sample interval within the AKB control interval. Negative-going pulse signal G is developed by circuit 15 during the clamp interval, from which a positive pulse component of a grid drive signal G' is developed for driving the grid electrode of the kinescope during the clamp interval.

Signal RS, as developed at the collector output of amplifier transistor 20 in FIG. 1, is a negative going amplified version of the black current representative AKB pulse induced when signal G' is applied to the kinescope grid electrode. Amplitude A of pulse RS varies by an amount "Δ" depending upon the deviation of the black current level from a desired level. Pulse P is a negative going pulse of amplitude A, and occurs during the sample interval following the clamp interval when pulse RS appears. Amplitude A of pulse P is fixed for a given setting of brightness control 10, and does not vary with changes in the kinescope black current level.

Signal RS is conveyed via transistor 20 to signal combining point A, and signal P is conveyed via potentiometer 21 to point A. A signal developed at point A, and AC coupled via capacitor 22 to sense input terminal 2 of AKB circuit 15, exhibits a magnitude related to the magnitude of the AKB pulse. Kinescope red bias control voltage RB for the red kinescope cathode is a function of the magnitude of pulse RS relative to the magnitude of pulse P, as described in detail in U.S. Pat. No. 4,484,228 of R. P. Parker except with respect to varying the magnitude of pulse P with the brightness control setting. Pulses RS and P are processed by AKB bias control circuit 15 such that, when the kinescope black current bias level is correct, the amplitudes of these pulses are equal, the voltage at point A does not change from the clamp interval to the sample interval, and the level of red cathode bias control voltage RB does not change. On the other hand, an incorrect black current bias condition will cause sensed pulse RS to exhibit a related amplitude variation of ±Δ. This amplitude variation relative to the amplitude of pulse P causes the voltage at point A to change by an amount ±Δ from the clamp interval to the sample interval, and results in a corresponding change in the level of red bias control voltage RB until by feedback action (as will be seen in connection with FIG. 2) a correct black current bias condition is achieved and the amplitudes of pulses RS and P are equalized.

The black current conducted by the kinescope cathode is related to the DC bias of the cathode, and the brightness of a displayed image is related to the DC bias of the cathode. Since a correct cathode black current bias condition is determined by the relationship between the magnitudes of pulses P and RS, and since the magnitude of pulse P is related to the setting of brightness control 12, adjustment of brightness control 12 causes a change in the brightness of a displayed image.

Signal G, from which grid drive signal G' is ultimately obtained, is coupled via an electronic switch 29 to a grid drive amplifier circuit as will be seen in FIG. 2. Switch 29 responds to a timing signal K from a source 28, which is also coupled to toggle inputs of switches 30a, 30b and 30c in a switching network 30 such as the CD 4053 integrated circuit commercially available from the Solid State Division of RCA Corporation, Somerville, N.J. The inputs of switches 30a, 30b and 30c are respectively coupled to red, green and blue output terminals 21, 19 and 17 of AKB circuit 15. One output terminal of switches 30a, 30b and 30c is connected directly to storage capacitors 32a, 32b and 32c, respectively, and to a noninverting (+) input terminal of buffer amplifiers 34a, 34b and 34c, respectively. The other output terminal of these switches is coupled to an inverting (−) input of buffer amplifiers 34a, 34b and 34c, respectively. Buffer amplifiers 34a, 34b and 34c each have an output coupled to an inverting input in a voltage follower configuration. In this case these buffers exhibit a very high input impedance at the inverting and noninverting inputs and a low output impedance, and are contained in the MOS-input quad op amp integrated circuit type CA 084 commercially available from the Solid State Division of RCA Corporation, Somerville, N.J.

The output circuitry associated with terminals 17, 19 and 21 of AKB circuit 21 sources and sinks current depending upon the need to correct an improper kinescope bias condition. Such output circuitry produces no output current if kinescope bias is correct. Illustratively, the output current of terminal 21 of AKB circuit 15 charges and discharges capacitor 32a during AKB "sensing" (sampling) intervals when switch 30 is in the upper position shown and AKB circuit 15 actively modifies the charge on capacitor 32a to produce a correct kinescope bias condition. At other times, hereinafter referred to as "holding" intervals, switch 30a occupies the lower position whereby output terminal 21 of AKB circuit 15 is coupled to the output of buffer 34a, and the charge on capacitor 32a can be held for hours with negligible loss due to the very high input impedance of buffer 34a. During the holding intervals, the bias control voltage on capacitor 32a is coupled via buffer 34a, switch 30a and an internal bipolar buffer circuit of the AKB circuit 15 to output terminal 20 of circuit 15, at which red bias control signal RB appears.

The AKB system is activated for a relatively short "sensing" interval of no more than about 2 seconds in this example, between considerably longer "holding" intervals of approximately 5 minutes duration in this example. This is accomplished in response to timing signal K which controls the position of switches 30a, 30b and 30c, and controls the operation of switch 29 which selectively passes grid signal G to a subsequent grid signal processing network as will be seen in FIG. 2.

Signal K exhibits a first level during the relatively short sensing interval, and a second, more positive, level during the much longer holding interval. During the sensing interval the AKB system is activated by permitting switch 29, e.g. to convey grid signal G to the kinescope grid electrode via the grid drive circuit, and by setting switches 30a, 30b and 30c to the uppermost position as illustrated for connecting capacitors 32a, 32b and 32c to red, green and blue output terminals 21, 19 and 17 of AKB circuit 15, respectively. Thus the kinescope cathode black current level is sampled, and the charge on capacitors 32a-32c is monitored and updated as required every vertical field interval for the duration of the sensing interval of signal K.

Signal G energizes the kinescope grid electrode to produce the black current representative AKB pulse during three horizontal lines in each field when the AKB system is activated, as explained previously and as seen from the waveforms of FIG. 3. As a consequence of the kinescope grid being so energized, three illuminated horizontal lines appear across the visible uppermost edge of the underscanned display screen, beginning shortly after the end of the vertical retrace interval but before the beginning of the active data display area of the screen, while signal G is present. Circuit 15 includes an internal AKB interval generator which defines the placement of the AKB interval within the display screen raster in response to the horizontal (H) and vertical (V) synchronizing signals. In the disclosed system the AKB operating interval encompasses clamping and sampling intervals within seven horizontal line intervals immediately after the end of the vertical retrace intervals, as seen from FIG. 3. In other monitors the AKB system can be arranged to have the illuminated horizontal lines appear along the bottom of the screen between the end of the active data display area and the beginning of the vertical retrace interval, or along both top and bottom edges of the display screen. In any case, the visible illuminated horizontal lines are placed outside of the active data display region to prevent destruction or distortion of the data being displayed and to reduce the visible effect of the illuminated lines.

The disclosed preferred sensing interval of up to 2 seconds and the holding interval of about 5 minutes have been observed to produce good bias control results without annoying the viewer. The duration of the sensing intervals depends on factors such as the time constant of the AKB system, the value of the AKB control voltage storage capacitor, and the current conduction capability at the output terminals (e.g., terminal 21) of the AKB circuit. The maximum duration of the sensing interval is a function of the anticipated viewer tolerance of the potentially disturbing illuminated horizontal lines developed during each AKB interval. A duration of 2 seconds or less has been found to be satisfactory. The minimum length of the sensing interval is primarily a function of the AKB time constant, i.e., the speed at which the AKB system is capable of correcting an improper bias condition within a given time period to assure that proper kinescope bias is maintained. The holding interval should be considerably longer than the sensing interval to reduce the potentially disturbing visible effect of the illuminated horizontal lines. The use of high input impedance buffer amplifiers 34a, 34b and 34c advantageously prevents the bias control voltage developed on the storage capacitors from deteriorating during the holding interval, and maintains a substantially constant voltage at output terminals 17, 19 and 21 of AKB circuit 15.

When the AKB system is activated during the sensing intervals as discussed, storage capacitor 32a is directly connected to output terminal 21 of AKB circuit 15 via switch 30a (up position). Buffer 34a is unused at such times. During holding intervals, the low impedance output of buffer 34a is connected to output terminal 21 of circuit 15 via switch 30a (down position). The bias control voltage developed across capacitor 32a is substantially replicated at the output of voltage follower buffer 34a and appears at terminal 21. However, during holding intervals capacitor 32a is essentially isolated from terminal 21 due to the very high input impedance of buffer 34a. Thus the disclosed arrangement of buffer 34a advantageously serves to maintain a substantially constant voltage at terminal 21 and to prevent deterioration of the voltage across capacitor 32a during the long holding intervals. Similar observations apply to the switches, buffers and storage capacitors associated with output terminals 17 and 19 of circuit 15.

The disclosed arrangement of buffers 34a, 34b and 34c also is advantageously used in connection with preset voltages V1, V2 and V3 supplied to storage capacitors 32a, 32b and 32c from a source 40. When a video monitor is initially energized, the kinescope cathodes are cold and consequently conduct very little or no current. The kinescope electron guns warm up to a normal operating temperature several seconds after the system is initially energized. This time delay varies from one kinescope type to another, but typically is on the order of about 10 to 15 seconds, after which the kinescope electron guns come into conduction rapidly. A typical AKB system usually requires about 2 to 5 seconds to achieve correct kinescope bias after the end of the kinescope warm-up interval. The time delay between energization of the system and achievement of correct kinescope bias is undesirable. During this interval before proper kinescope bias is established, a displayed picture can exhibit distorted colors, with the colors often changing as the kinescope bias is gradually adjusted to the correct value through the action of the AKB system. This undesirable effect is eliminated by means of preset voltage source 40 in association with a switching network 42 and a timer 46 (e.g., a monostable multivibrator), which respond to the operation of a source of AC power 43, a viewer operated power switch 44, and a source of system operating potentials 45.

The system is initially energized in response to plural system operating voltages (B+, (+), ... (−)) being developed by source 45 when source 45 is energized from AC power source 43 when power switch 44 is placed in the "ON" position. The activation of source 45 causes timer 46 to develop a PRESET pulse of fixed duration, e.g., several seconds corresponding to the time required by the kinescope to warm up sufficiently. The PRESET pulse causes switch elements 42a, 42b and 42c of network 42 to close, thereby conveying preset voltages V1, V2 and V3 to AKB storage capacitors 32a, 32b and 32c respectively. These voltages are typically derived from potentiometers in source 40 and exhibit levels such that, when applied to the red, green and blue electron guns of the kinescope via the AKB system, the respective kinescope electron guns are caused to be initially maintained at nominally correct bias values. At the end of the initial interval encompassed by the PRESET pulse, switches 42a, 42b and 42c are caused to open as shown, whereby the preset voltages are decoupled from the storage capacitors. AKB action then continues with respect to warm kinescope electron guns and an associated bias condition which can be expected to approximate the initial bias condition established by the preset network.

Buffers 34a, 34b and 34c advantageously act in the same manner with respect to the preset voltages developed across storage capacitors 32a, 32b and 32c during the initial preset interval as with respect to the holding intervals during normal AKB operation as previously discussed. Only one buffer per channel is required in connection with both the normal holding mode and the initial preset mode.

The sensing interval pulse component to activate the AKB system can be developed by applying locally generated periodic trigger pulses to a monostable multivibrator for developing the 2 second sensing interval pulse every five minutes or so.

Additional details of the AKB control system of FIG. 1 are shown in FIG. 2.

In FIG. 2, a low level color video signal r from a source 70 is applied to a preamplifier 71 which responds to a gain adjustment (GAIN ADJ.) input signal for varying the amplitude of the red (r) video signal, and to AKB blanking signal B. Blanking signal B inhibits the operation of preamplifier 71 to prevent signal r from interfering with the operation of the AKB system during AKB intervals.

An amplified video signal from preamplifier 71 is applied to a display driver amplifier stage 72 which provides a high level amplified RED color video signal suitable for directly driving a red intensity control cathode electrode 73a of a color kinescope 75. Kinescope 75 has a control grid 76 common to each of cathode electrodes 73a, 73b and 73c. Grid 76 forms an electron gun assembly with each of cathodes 73a, 73b and 73c.

Driver 72 comprises an input common emitter amplifier transistor 84 arranged in a cascode amplifier configuration with a video output common base transistor 86. A transistor 88 comprises an active load circuit for driver 72. The high level RED video signal is developed at an emitter of transistor 88 and is AC coupled via a capacitor 90 and a current limiting resistor 91 to red video signal cathode 73a.

A bias control network 100 comprises the circuit elements of FIG. 1 with the exception of units 10, 43, 45 and 46. Red cathode bias control signal RB from circuit 100 is provided as an input to a DC restoration clamping circuit 105, the output of which is coupled to a video output signal path following AC coupling capacitor 90. Clamp circuit 105 coacts with capacitor 90 to maintain a desired restored DC bias condition for the red kinescope cathode. The magnitude of the restored red cathode bias voltage is a function of the magnitude of bias control voltage RB. Clamp 105 is normally keyed to operate during the so-called "back porch" portion of each horizontal line blanking interval in response to a clamp keying signal C. Signal C is interrupted during AKB operating intervals by means of a switch 108 in response to AKB blanking signal B, whereby the operation of the clamp is inhibited during AKB operating intervals to prevent the clamp from distorting the induced black level representative AKB pulse.

In like manner, green and blue signal processors 120 and 130 respectively receive low level green (g) and blue (b) video signals from source 70 for producing GREEN and BLUE color video signals for driving kinescope cathodes 73b and 73c. Each of processors 120 and 130 includes a preamplifier, kinescope driver amplifier stage, output AC coupling capacitor and cathode current limiting resistor, and clamp and switch network as discussed above in connection with the red signal path.

A grid blanking signal generator 116 responds to horizontal (H) and vertical (V) deflection signals for producing, during horizontal and vertical blanking intervals, a grid blanking signal GB which is applied via an electronic switch 117 to a grid drive circuit 118 including amplifier circuits. Switch 117 responds to AKB blanking signal B for interrupting the application of grid blanking signal GB to drive circuit 118 during AKB operating intervals. Grid drive circuit 118 also receives signal G which is developed by bias control circuit 100 during AKB intervals as discussed. Grid drive circuit 118 provides grid drive output signal G' to grid electrode 76. Grid drive signal G' includes a positive pulse component during AKB control intervals as shown in FIG. 3, and a negative grid blanking pulse component (not shown in FIG. 3) during horizontal and vertical blanking intervals outside of the AKB interval.

At other times, i.e., during image trace intervals, signal G' exhibits a given DC level for biasing grid 76.

During AKB operating control intervals when the positive pulse component of grid drive signal G' is developed, the resulting black current representative AKB pulse is coupled via capacitor 90 to the emitter of transistor 88 of red display driver 72. A related positive version of the AKB pulse appears across a load resistor 89 in the collector circuit of transistor 88 and is coupled to bias control unit 100 as signal RS, which is processed as discussed previously in connection with FIG. 1. Resulting red bias control signal RB is applied to clamp 105 for establishing a desired DC restored bias condition of red cathode 73a. The established DC bias of the red kinescope cathode is a function of the magnitude of the AKB pulse and the setting of the brightness control, as discussed. The green and blue video signal channels operate in a similar manner.

Apparatus in accordance with the principles of the present invention as disclosed can also be used in an automatic white balance control system, sometimes referred to as an automatic kinescope drive (AKD) control system. In an AKD system a white reference level is applied to each video channel, and the signal gain parameter (rather than the bias parameter) of the kinescope is automatically adjusted such as by varying the signal gain of the kinescope driver amplifiers so that the kinescope displays a white image in response to a video signal containing white information.

What is claimed is:

1. A video signal processing and display system comprising:
   an image display device;
   means coupled to said display device for providing a signal having a magnitude representative of the condition of an operating parameter of said display device; and
   control means responsive to said representative signal for providing a control signal to said display device for maintaining a desired condition of said operating parameter, wherein said control means comprises
   a charge storage device;
   means for developing, at an output terminal, a signal having a magnitude related to the magnitude of said representative signal;
   an amplifier;
   timing means; and
   switching means coupled to said charge storage device, to said amplifier, and to said output terminal of said developing means, and being responsive to said timing means for exhibiting (a) a first position for connecting said charge storage device directly to said output terminal of said developing means via a current path exclusive of said amplifier, and (b) a second position for connecting said charge storage device to said output terminal of said developing means via said amplifier.

2. A video signal processing and display system comprising:
   an image display device;
   means coupled to said display device for providing a signal having a magnitude representative of the condition of an operating parameter of said display device; and
   control means responsive to said representative signal for providing a control signal to said display device for maintaining a desired condition of said operating parameter, wherein said control means comprises
   a charge storage device;
   means for developing, at an output terminal, a signal having a magnitude related to the magnitude of said representative signal;
   an amplifier having a high impedance input coupled to said charge storage device and a low impedance output;
   timing means; and
   switch means having an input coupled to said output terminal of said developing means, a first output coupled to said charge storage device and to said input of said amplifier; and a second output coupled to said low immpedance output of said amplifier; wherein
   said switch means is responsive to said timing means for exhibiting (a) a first position for connecting said output terminal of said developing means to said first output terminal of said switch means, and (b) a second position for connecting said output terminal of said developing means to said second output of said switch means.

3. A system according to claim 2, wherein said amplifier has a high impedance signal inverting input coupled to said low impedance output, and said high impedance input comprises a high impedance noninverting signal input coupled to said charge storage device;
   said first output of said switch means is coupled to said charge storage device and to said noninverting input of said amplifier; and
   said second output of said switch means is coupled to said inverting input and said low impedance output of said amplifier.

4. A system according to claim 2 and further comprising:
   a source of auxiliary control voltage coupled to said charge storage device via a current path exclusive of said amplifier and said switch means.

* * * * *